US011166329B2

United States Patent
Jornod et al.

(10) Patent No.: US 11,166,329 B2
(45) Date of Patent: Nov. 2, 2021

(54) VEHICLE, SYSTEM, APPARATUSES, METHODS, AND COMPUTER PROGRAM FOR USER EQUIPMENT AND A NETWORK COMPONENT OF A MOBILE COMMUNICATION SYSTEM

(71) Applicant: VOLKSWAGEN AKTIENGESELLSCHAFT, Wolfsburg (DE)

(72) Inventors: Guillaume Jornod, Berlin (DE); Daniel Reimann, Braunschweig (DE); Steffen Schmitz, Wesel (DE)

(73) Assignee: Volkswagen Aktiengesellschaft

( * ) Notice: Subject to any disclaimer, the term of this patent is extended or adjusted under 35 U.S.C. 154(b) by 86 days.

(21) Appl. No.: 16/806,697

(22) Filed: Mar. 2, 2020

(65) Prior Publication Data

US 2020/0296782 A1    Sep. 17, 2020

(30) Foreign Application Priority Data

Mar. 13, 2019  (EP) .................................... 19162469

(51) Int. Cl.
*H04W 76/14*    (2018.01)
*H04W 4/40*    (2018.01)
(Continued)

(52) U.S. Cl.
CPC ............. *H04W 76/14* (2018.02); *H04W 4/40* (2018.02); *H04W 72/042* (2013.01); *H04W 88/16* (2013.01); *H04W 92/18* (2013.01)

(58) Field of Classification Search
CPC ........ H04B 7/15; H04W 28/16–28/26; H04W 72/00; H04W 72/042;
(Continued)

(56) References Cited

U.S. PATENT DOCUMENTS 10,924,912 B2 *   2/2021   Kim ...................... H04W 48/08

FOREIGN PATENT DOCUMENTS

WO    2005053347 A1    6/2005
WO    2016085372 A1    6/2016

OTHER PUBLICATIONS

Kar et al.; An overview of device-to-device communication in cellular networks; School of Computer Engineering; KIIT University; Bhubaneswar, India; Oct. 9, 2017; pp. 203-208.
(Continued)

*Primary Examiner* — Asad M Nawaz
*Assistant Examiner* — Thomas R Cairns
(74) *Attorney, Agent, or Firm* — Barnes & Thornburg LLP

(57) ABSTRACT

A transportation vehicle, a system, apparatuses, methods, and a computer programs for user equipment and a network component of a mobile communication system. The method for a first user equipment (UE) of a first mobile communication system operated by a first operator includes transmitting information related to a subsequent direct communication with second user equipment to a network component of the first mobile communication system. The second UE is assigned to a second mobile communication system operated by a second operator. The method also includes receiving information related to a coordinating network component from the first network component. The coordinating network component is a network component of the first or the second mobile communication system. The method also includes receiving information related to radio resources to use for the communication with the second UE from the coordinating network component.

21 Claims, 4 Drawing Sheets

(51) Int. Cl.
*H04W 72/04* (2009.01)
*H04W 88/16* (2009.01)
*H04W 92/18* (2009.01)

(58) Field of Classification Search
CPC .................... H04W 72/1205–72/1257; H04W 72/1278–72/1294; H04W 74/002; H04W 76/14; H04W 84/047; H04W 84/18; H04W 88/04; H04W 88/16; H04W 92/02; H04W 92/18; H04W 92/20
See application file for complete search history.

(56) References Cited

OTHER PUBLICATIONS

Kousaridas; Multi-RAT, Multi-Link, Multi-operator V2X Commuﬁcations; Huawei Technologies, Munich Research Center, Germany; 5G V2X Communications; Summer School; Jun. 11-12, 2018.

\* cited by examiner

VEHICLE, SYSTEM, APPARATUSES, METHODS, AND COMPUTER PROGRAM FOR USER EQUIPMENT AND A NETWORK COMPONENT OF A MOBILE COMMUNICATION SYSTEM

PRIORITY CLAIM

This patent application claims priority to European Patent Application No. 19162469.1, filed 13 Mar. 2019, the disclosure of which is incorporated herein by reference in its entirety.

SUMMARY

Illustrative embodiments relate to a transportation vehicle, a system, apparatuses, methods, and a computer programs for user equipment and a network component of a mobile communication system, more particularly, but not exclusively, to a concept for multi operator sidelink resource assignment in a mobile communication system.

BRIEF DESCRIPTION OF THE DRAWINGS

Disclosed embodiments will be described using the following non-limiting embodiments of apparatuses or methods or computer programs or computer program products by way of example only, and with reference to the accompanying figures, in which.

DETAILED DESCRIPTION

Figure 1:
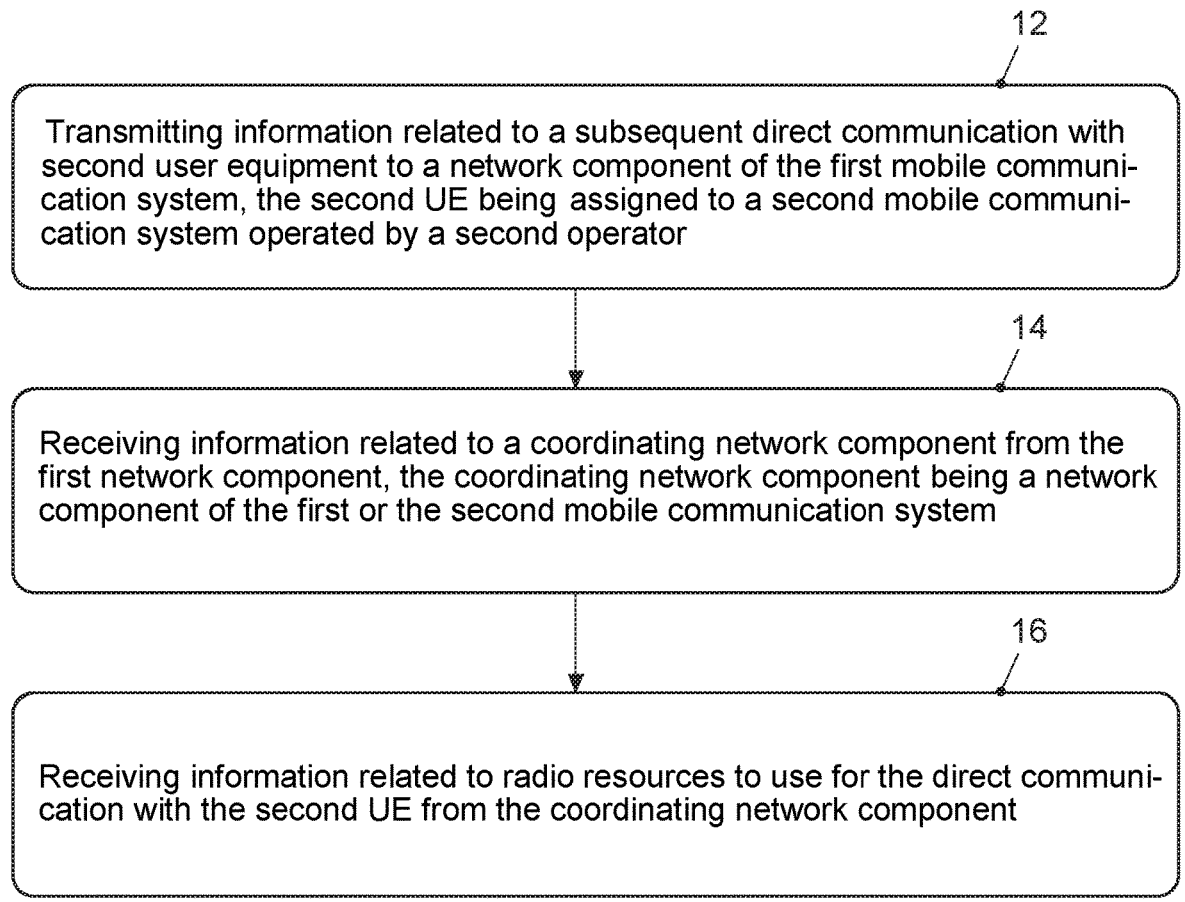
FIG. 1 illustrates a block diagram of an embodiment of a method for user equipment.

Direct communication between mobile devices, also referred to as device-to-device (D2D), vehicle-to-vehicle (V2V), or car-to-car communication, has been a feature under development of newer generation of mobile communication systems. By enabling direct communication between devices, lower latencies can be achieved. Moreover, if the radio resources are coordinated properly, interference conditions may also be improved and the overall network capacity may increase.

Udit Narayana Kar et al, "An overview of device-to-device communication in cellular networks", School of Computer Engineering, KIIT University, Bhubaneswar-751024, India, ICT Express 4 (2018) 203-208, available online 9 Oct. 2017, gives an overview of D2D communication, which is expected to play a significant role in upcoming cellular networks as it promises ultra-low latency for communication among users. This new mode may operate in licensed or unlicensed spectrum. This paper discusses the main characteristics of D2D communication including its usage scenarios, architecture, technical features, and areas of active research.

Apostolos Kousaridas, "Multi-RAT, Multi-Link, Multi-operator V2X Communications", Huawei Technologies, Munich Research Center, Germany, 5G V2X Communications—Summer School, 11-12 Jun. 2018, lines out various concepts for V2X (vehicle to anything) communication considering multiple scenarios, in particular, V2V communication in a multi-operator scenario.

The next generation mobile networks (ngmn) alliance published a V2X Whitepaper, v 1.0, Jun. 17, 2018, which also provides an overview on V2X as well as a technology evaluation.

Conventional concepts consider V2V and V2X concepts. In a multi-operator scenario known concepts suggest defining geographical areas in which one of multiple operators is in charge of a resource assignment for direct communication. Depending on the number of devices and the amount of direct links, which have to be coordinated, such a regional role assignment may be problematic.

There is a demand for an improved concept for resource assignment in a multi-operator direct communication scenario.

Disclosed embodiments are based on the finding that network nodes of different operators can communicate with each other. Once a device signals the desire to directly communicate with device under control of a different operator, the other operator's network component can be contacted. Once two network components communicate, different options are conceivable on how the resources for the direct communication are assigned and coordinated. Disclosed embodiments provide flexibility with respect to resource assignment and control.

Disclosed embodiments provide a method for first user equipment, UE, of a first mobile communication system operated by a first operator. The method comprises transmitting information related to a subsequent direct communication with second user equipment to a network component of the first mobile communication system. The second UE being assigned to a second mobile communication system operated by a second operator. The method further comprises receiving information related to a coordinating network component from the first network component. The coordinating network component is a network component of the first or the second mobile communication system. The method further comprises receiving information related to radio resources to use for the communication with the second UE from the coordinating network component. Disclosed embodiments enable to flexibly assign the role of the coordinating network component to either of the operators.

The information related to the coordinating network component may comprise information related to setting up a control link with the network component of the second mobile communication system if the coordinating network component is the network component of the second mobile communication system. Disclosed embodiments may enable a first UE to set up a control connection to another operator's network.

In some disclosed embodiments the information related to the radio resource is received via the network component of the first mobile communication system. Disclosed embodiments may enable a network component from the second operator to communicate with the first UE through a network component of the first operator.

The method may further comprise enabling a communication link between the network components of the first and the second mobile communication systems via the second UE. The UEs may hence enable a bridging or tunneling mode between network components of different operators such that efficient communication is enabled.

In a further disclosed embodiment the method further comprises receiving a data packet from the network of the first mobile communication system and forwarding the data packet to the second UE. The first UE may relay data packets communicating control information between the network components of different operators.

Disclosed embodiments also provide a method for a network component of a first mobile communication system operated by a first operator. The method comprises receiving, from the first user equipment, information related to a subsequent communication with second user equipment being assigned to a second mobile communication system operated by a second operator. The method further comprises communicating with a network component of the second mobile communication system to determine a coordinating network component. The coordinating network component assigns radio resources for the communication between the first and second UEs. The method further comprises transmitting information related to the coordinating network component to the first UE. Disclosed embodiments enable network components of different operators to communicate or negotiate the coordination of radio resources for inter-operator direct communication links.

The communicating/communication with the network component of the second mobile communication system may be carried out via the first and second UEs. Disclosed embodiments may enable a control link between the network components via the UEs. In some disclosed embodiments, the method may further comprise enabling a communication link between the network components of the first and the second mobile communication systems via the first and second UEs. Disclosed embodiments may enable a control tunnel via the UEs. In some disclosed embodiments the method may enable a control interface between the network components of the first and the second mobile communication systems via the first and second UEs. Communication between arbitrary network components of different operators may be enabled through such an interface.

In further disclosed embodiments, the method may comprise enabling a communication link between the network components of the first and the second mobile communication systems via core networks/backhauls of the first and second mobile communication systems. A communication connection between the two network components may be established via the internet in some disclosed embodiments.

The coordinating network component may assume a master role for assigning the radio resources and the other network component may assume a slave role. In some disclosed embodiments, the control over the resources may be divided in a master/slave state such that the slave network component mainly follows instructions from the master (coordinating) network component. In this way, at least some disclosed embodiments may leave some control to an operator's slave network component.

Disclosed embodiments further provide an apparatus for user equipment or for a network component of a mobile communication system. The apparatus comprises one or more interfaces, which are configured to communicate in the mobile communication system. The apparatus further comprises a control module, which is configured to control the one or more interfaces. The control module is further configured to perform one of the methods described herein. A transportation vehicle, a UE, a network component, or a system comprising one or more such apparatuses are further disclosed embodiments.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 shows a block diagram of an exemplary embodiment of a method 10 for first user equipment, UE, of a first mobile communication system operated by a first operator. The method 10 comprises transmitting 12 information related to a subsequent direct communication with second user equipment to a network component of the first mobile communication system. The second UE is assigned to a second mobile communication system operated by a second operator. The method further comprises receiving 14 information related to a coordinating network component from the first network component. The coordinating network component is a network component of the first or the second mobile communication system. The method comprises receiving 16 information related to radio resources to use for the communication with the second UE from the coordinating network component.

Figure 2:
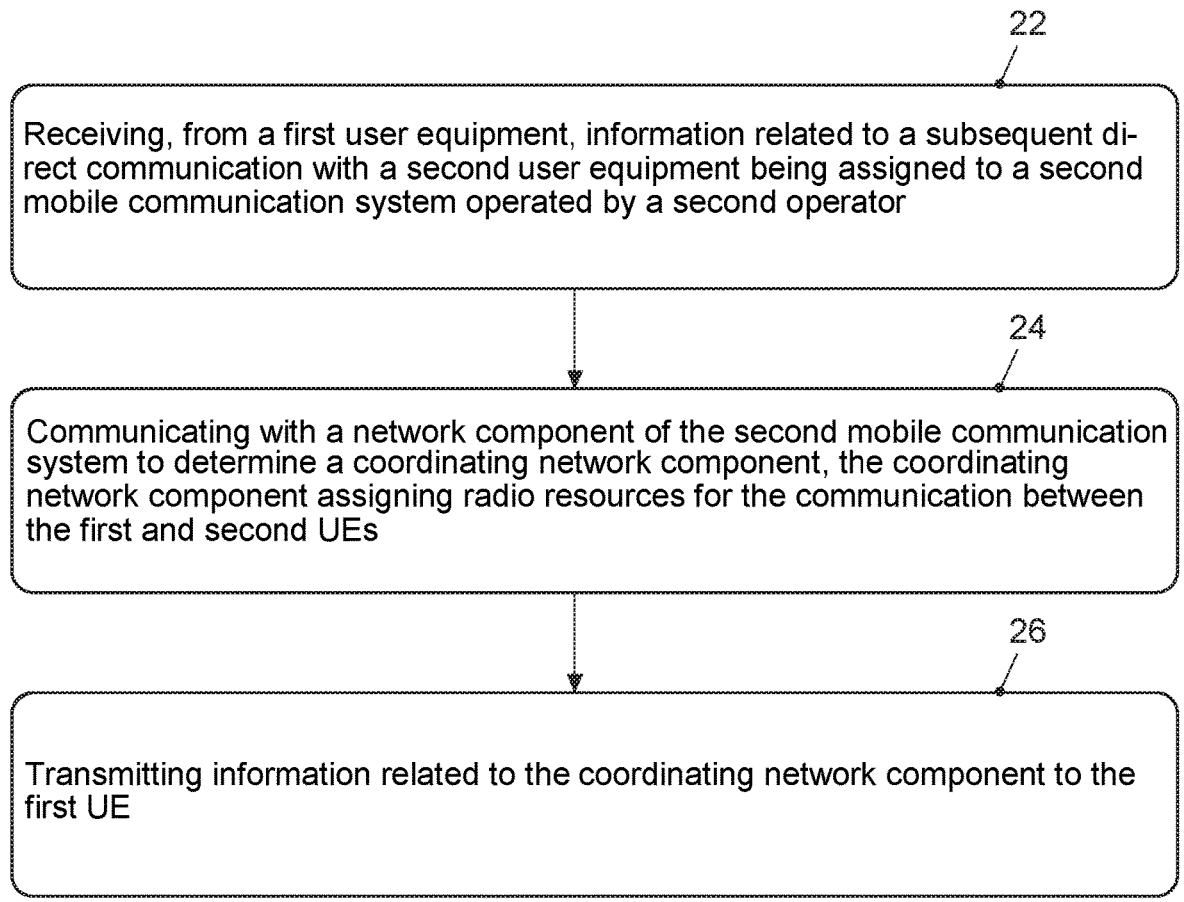
FIG. 2 shows a block diagram of an embodiment of a method for a network component.

FIG. 2 shows a block diagram of an exemplary embodiment of a method 20 for a network component of a first mobile communication system operated by a first operator. The method 20 comprises receiving 22, from first user equipment, information related to a subsequent direct communication with second user equipment being assigned to a second mobile communication system operated by a second operator. The method comprises communicating 24 (transmitting, receiving, or both) with a network component of the second mobile communication system to determine a coordinating network component. The coordinating network component assigns radio resources for the communication between the first and second UEs. The method further comprises transmitting 26 information related to the coordinating network component to the first UE.

Figure 3:
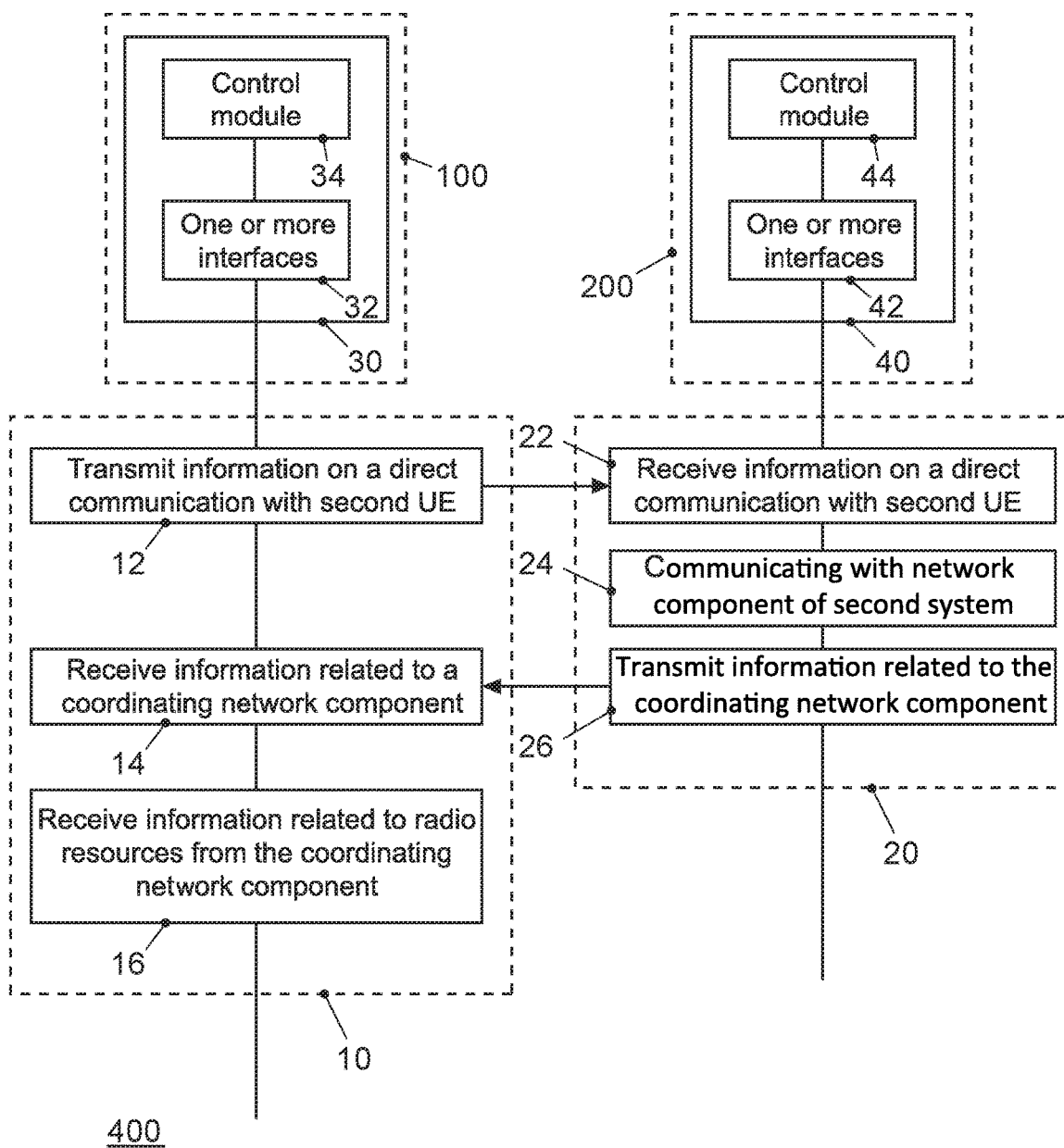
FIG. 3 illustrates block diagrams of embodiments of an apparatus for user equipment, an apparatus for a network component, user equipment, a network component, and a system.

FIG. 3 illustrates a block diagram of disclosed embodiments of an apparatus 30 for user equipment 100, an apparatus 40 for a network component 200, user equipment 100, a network component 200, and a system 400.

The apparatus 30 for the UE 100 comprises one or more interfaces 32 configured to communicate in the mobile communication system 400. The apparatus 30 further comprises a control module 34, which is coupled to the one or more interfaces 32 and which is configured to control the one or more interfaces 32. The control module 34 is further configured to perform one of the methods 10 as described herein. FIG. 3 further illustrates an exemplary embodiment of user equipment 100 comprising an exemplary embodiment of the apparatus 30. A transportation vehicle comprising such user equipment 100 is another disclosed embodiment. FIG. 3 also shows an exemplary embodiment of an apparatus 40 for a network component 200 of a mobile communication system 400. The apparatus 40 comprises one or more interfaces 42, which are configured to communicate in the mobile communication system 400. The apparatus 40 further comprises a control module 44, which is coupled to the one or more interfaces 42 and which is configured to control the one or more interfaces 42. The control module 44 is further configured to perform one of the methods 20 described herein.

In disclosed embodiments, the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to capabilities, control information, payload information, application requirements, trigger indications, requests, messages, data packets, acknowledgement packets/messages, etc.

As shown in FIG. 3 the one or more interfaces 32, 42 are coupled to the control module 34, 44 at the apparatus 30,40. In disclosed embodiments the control module 34, 44 may be implemented using one or more processing units, one or more processing devices, any method or mechanism for processing, such as a processor, a computer or a programmable hardware component being operable with accordingly adapted software. In other words, the described functions of the control modules 34, 44 may as well be implemented in software, which is then executed on one or more programmable hardware components. Such hardware components may comprise a general purpose processor, a Digital Signal Processor (DSP), a micro-controller, etc.

FIG. 3 also shows an exemplary embodiment of a system 400 comprising disclosed embodiments of the UE 100 and network component 200. In disclosed embodiments, communication, i.e., transmission, reception or both, may take place among UEs 100 directly and/or between mobile transceivers/transportation vehicles 100 and a network component 200 (infrastructure or mobile transceiver, e.g., a base station, a network server, a backend server, etc.). Such communication may make use of a mobile communication system 400. Such communication may be carried out directly, e.g., by device-to-device (D2D) communication, which may also comprise vehicle-to-vehicle (V2V) or car-to-car communication in case of transportation vehicles 100. Such communication may be carried out using the specifications of a mobile communication system 400.

In disclosed embodiments the one or more interfaces 32, 42 can be configured to wirelessly communicate in the mobile communication system 400. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct cellular vehicle-to-anything (C-V2X), where V2X includes at least V2V, V2-Infrastructure (V2I), etc., transmission according to 3GPP Release 14 onward can be managed by infrastructure (so-called mode 3) or run in a UE.

FIG. 3 also illustrates an exemplary embodiment of the method 10 from the perspective of user equipment 100 and an exemplary embodiment of the method 20 from the perspective of the network component 200. The UE transmits 12 information related to a subsequent direct communication with a second UE to the network component 200 of the first mobile communication system 400. The network component 200 receives 22 this information and communicates 24 with a network component of the second operator/mobile communication system to determine, whether the network component 200 or the network component of the second operator becomes the coordinating network component. The result is transmitted 26 to the UE 100. The UE 100 receives 14 the information related to the coordinating network component from the first network component 200. Subsequently, the UE receives 16 information related to radio resources to use for the communication with the second UE from the coordinating network component.

Figure 4:
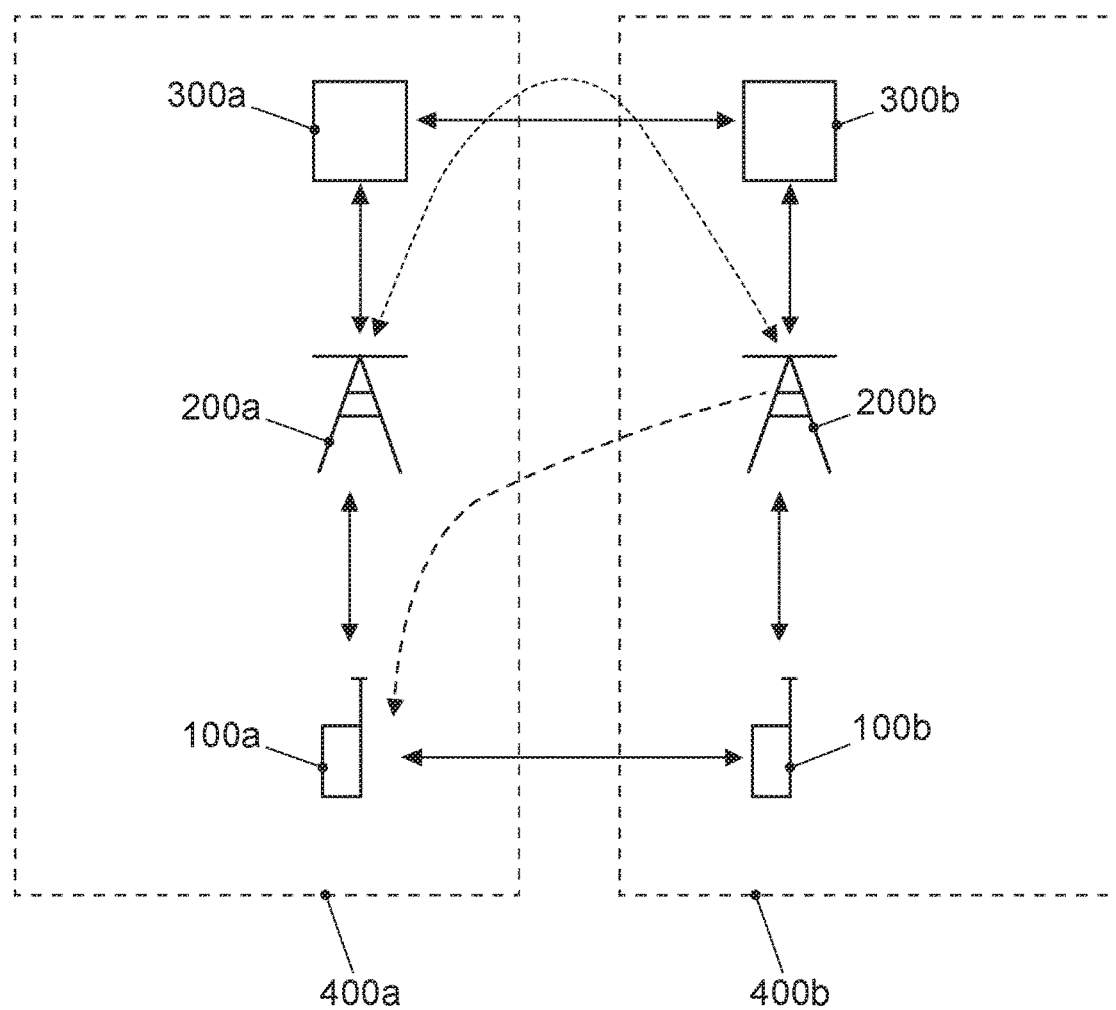
FIG. 4 depicts resource assignment and different communication paths in an embodiment.

FIG. 4 depicts resource assignment and different communication paths in an exemplary embodiment. FIG. 4 shows a first mobile communication system 400a, with a first UE 100a, a first network component 200a, and a first backend or core network 300a. FIG. 4 also shows a second mobile communication system 400b, with a second UE 100b, a second network component 200b, and a second backend or core network 300b. In line with the above it is assumed that the first UE 100a indicates to the network component 200a that is wants to directly communicate with UE 100b from the second mobile communication system/operator 400b. A communication is established between the network components 200a and 200b to determine which one will be the coordinating network node. For this communication there are several options in disclosed embodiments, which will be detailed subsequently. Likewise, for the communication between the coordinating network node and the UEs 100, 100a, 100b there are multiple options.

In some disclosed embodiments the first UE 100a may receive signals from the second UE 100b and/or vice versa. Such signals may comprise information related to identifications of the respective UEs 100a, 100b, their mobile communication system 400a, 400b, and/or their serving network components 200a, 200b. UE 100a reporting to network component 200a may hence provide information related to the second UE 100b, the second mobile communication system 400b, and/or the second network component 200b. In some disclosed embodiments, a network topology may be known among the operators and an indication on the second UE 100b may be enough for the network component 200a to figure out the second network component 200b and the second mobile communication system 400b. For example, UE 100a may provide an address (e.g., IP address) of the second UE 100b to the first network component 200a. From the address the first mobile communication system 400a may be able to tell, which one is the second mobile communication system 400b and upon request, for example, remaining information may be determined based on the address.

The first and second mobile communication systems 400, 400a, 400b, as shown in the FIGS. 3 and 4, may, for example, correspond to one of the Third Generation Partnership Project (3GPP)-standardized mobile communication networks, where the term mobile communication system is used synonymously to mobile communication network. The mobile or wireless communication system 400, 400a, 400b may correspond to a mobile communication system of the 5th Generation (5G, or New Radio (NR)) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component 200, 200a, 200b such as a base station transceiver, a relay station or a UE, e.g., coordinating service provision in a cluster or group of multiple UEs. A base station transceiver can be operable or configured to communicate with one or more active mobile transceivers/transportation vehicles 100, 100a, 100b and a base station transceiver can be located in or adjacent to a coverage area of another base station transceiver, e.g., a macro cell base station transceiver or small cell base station transceiver. Hence, disclosed embodiments may provide a mobile communication system 400, 400a, 400b comprising two or more mobile transceivers/transportation vehicles 100, 100a, 100b and one or more base station transceivers 200, 200a, 200b, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver/transportation vehicle 100, 100a, 100b can be associated with a network component 200, 200a, 200b, a base station transceiver or a cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following, a cell may represent an according base station transceiver generating the cell or, likewise, a base station transceiver may represent a cell the base station transceiver generates.

UEs/Transportation Vehicles 100, 100a, 100b may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, DSRC, respectively. Technologies enabling such D2D-communication include 802.11p, 3GPP system (4G, 5G, NR and beyond), etc. For example, the two UEs 100a, 100b in FIG. 4 are two transportation vehicles which share a certain section of their route. Accordingly, they would like to exchange certain messages, for example, Cooperative Awareness Messages (CAM) or Decentralized Environment Notification Messages (DENM), etc. For example, certain broadcast signals may be detected such that the transportation vehicles 100a, 100b may become aware of each other. At some point, they would like to directly communicate with each other, e.g., to form a cluster or platoon or any other purpose.

In the following disclosed embodiment, it will be assumed that the second network component 200b of the second mobile communication system 400b becomes the coordinating network component. The information related to the coordinating network component comprises information related to setting up a control link with the network component 200b of the second mobile communication system 400b if the coordinating network component is the network component 200b of the second mobile communication system 400b. This is indicated by the broken line arrow shown in FIG. 4. It is noted that different network, traffic, load situations may occur and that disclosed embodiments allow to negotiate or determine the coordinating network component based on these conditions. Hence, in another situation the first network component 200a may as well become the coordinating network component.

Disclosed embodiments may enable to share a scheduling load among the network components 200a, 200b of the different operators. For example, the number of PC5 or sidelink connections in traffic can be very high. A scheduler located in one network component might get overloaded by having to schedule so many D2D connections. Such a load may be shared in disclosed embodiments allowing both network components 200a, 200b to participate in the scheduling of PC5/sidelink resources by assigning different pairs of UEs to them. For example, the network components 200a, 200b may each coordinate a part of the overall PC5/sidelink resources. Disclosed embodiments may enable a scheduling/control load balancing among network components 200a, 200b of different operators.

In the disclosed embodiment shown in FIG. 4 the coordinating network component 200b controls UE 100a at least with respect to the radio resources used to directly communicate (sidelink, PC5, V2V, Car2Car, D2D) with the UE 100b. This may be a direct wireless communication link with the second network component 200b. In other words, in one option a wireless control channel may be established directly. In other disclosed embodiments, such a communication link may be through the first network component 200a. The first network component 200a may hence forward such information from the second network component 200b through a wireless link to the UE 100a. The information related to the radio resource is then received via the network component 200a of the first mobile communication system 400a.

In further disclosed embodiments the UE 100a may enable a communication link between the network components 200a, 200b of the first and the second mobile communication systems 400a, 400b via the second UE 100b. For example, tunneling is a concept that may be used by the UEs 100a, 100b. For example, when initially detecting each other a set of default radio resources (e.g., unlicensed spectrum, or radio resources dedicated for this purpose by one of the mobile communication systems 400a, 400b) may be used to establish a control link between the UEs 100a, 100b. Since the UEs 100a, 100b have individual links with their serving network components 200a, 200b, they can enable the communication between the network components 200a, 200b. UE 100a may receive a data packet from the network component 200a of the first mobile communication system 400a and forward the data packet to the second UE 100b. Likewise, it may receive a data packet from the second UE 100b and forward it to the network component 200a. UE 100b may consequently receive and transmit the data packets from/to the second network component 200b.

Hence, the communicating 24 with the network component 200b of the second mobile communication system 400b is carried out via the first and second UEs 100a, 100b in this disclosed embodiment. For example, a virtual interface between the network components 200a, 200b may be established. In a 3GPP network there are known interfaces between the (e-, g-) NodeBs, e.g., the X2 interface. In some disclosed embodiments the X2-interface may be tunneled using the two UEs 100a, 100b. The enabling of the communication link between the network components 200a, 200b of the first and the second mobile communication systems 400a, 400b via the first and second UEs 100a, 100b may be under control of the respective network components 200a, 200b. The network components 200a, 200b may instruct the UEs 100a, 100b to establish corresponding radio bearers, enable packet encapsulation etc. Such a tunnel may constitute a control interface between the network components 200a, 200b of the first and the second mobile communication systems 400a, 400b via the first and second UEs 100a, 100b.

In further disclosed embodiments a communication link between the network components 200a, 200b of the first and the second mobile communication systems 400a, 400b may be enabled via core networks/backhauls 300a, 300b of the first and second mobile communication systems 400a, 400b. This option is indicated by the dotted arrow in FIG. 4. For example, such a connection may be established via other external nodes outside of both mobile communication systems 400a, 400b, e.g., via the internet. Again, this connection may enable a sort of tunneled control link between the network components 200a, 200b. In both options (via the UEs 100a, 100b and via the core 300a, 300b) a sort of virtual X2-interface between nodes of different operators may be enabled.

The coordinating network component may assume a master role of for assigning the radio resources and the other network component may assume a slave role. For example, the coordinating network component may decide on a coarse resource assignment, e.g., based on a larger time interval and the slave network component may decide on a finer resource assignment. Multiple further options of two stage scheduling mechanisms are conceivable. For example, the coordinating network component may assign a portion of radio resources to the other network component. The other network component may then freely schedule from the portion of radio resources to the served UEs. This way some control is kept at the operator's network component, but an overall resource coordination can be carried at a central coordinating network component.

In some disclosed embodiments, the network components 200a, 200b may agree on a set of resources, which is used for direct communication. This set of radio resources may be part of a spectrum licensed to one of the operators or it may be unlicensed. The coordinating network node may then coordinate the direct communication between the UEs 100a, 100b according to one of the embodiments described herein.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having a method or mechanism for performing each of the respective operations of these methods.

LIST OF REFERENCE SIGNS 10 method for user equipment
12 transmitting information related to a subsequent direct communication with second user equipment to a network component of the first mobile communication system
14 receiving information related to a coordinating network component from the first network component
16 receiving information related to radio resources to use for the communication with the second UE from the coordinating network component
20 method for network component
22 receiving, from first user equipment, information related to a subsequent communication with second user equipment being assigned to a second mobile communication system operated by a second operator
24 communicating with a network component of the second mobile communication system to determine a coordinating network component
26 transmitting information related to the coordinating network component to the first UE
30 apparatus for user equipment
32 one or more interfaces
34 control module
40 apparatus for network component
42 one or more interfaces
44 control module
100 user equipment
100a user equipment
100b user equipment
200 network component
200a network component 200b network component
300 Core/backhaul network
300a Core/backhaul network
300b Core/backhaul network
400 mobile communication system
400a mobile communication system
400b mobile communication system

The invention claimed is:

1. An apparatus for first User Equipment (UE) of a first mobile communication system operated by a first operator, the apparatus comprising:
one or more interfaces configured to communicate in the first mobile communication system; and
a control module configured to control the one or more interfaces,
wherein the control module transmits information related to a subsequent direct communication with a second UE to a network component of the first mobile communication system, the second UE being assigned to a second mobile communication system operated by a second operator, receives information related to a coordinating network component from the first network component, the coordinating network component being a network component of the first or the second mobile communication system, receives information related to radio resources to use for the communication with the second UE from the coordinating network component, and receives a data packet from the network component of the first mobile communication system and forwarding the data packet to the second UE.

2. A transportation vehicle comprising the apparatus of claim 1.

3. The apparatus of claim 1, wherein the information related to the coordinating network component comprises information related to setting up a control link with the network component of the second mobile communication system in response to the coordinating network component being the network component of the second mobile communication system.

4. The apparatus of claim 1, wherein the information related to the radio resource is received via the network component of the first mobile communication system.

5. The apparatus of claim 1, wherein a communication link is enabled between the network components of the first and the second mobile communication systems via the second UE.

6. An apparatus for a network component of a first mobile communication system operated by a first operator, the apparatus comprising:
one or more interfaces to communicate in the mobile communication system; and
a control module to control the one or more interfaces,
wherein the control module receives information from a first User Equipment (UE) related to a subsequent direct communication with second UE being assigned to a second mobile communication system operated by a second operator, communicates with a network component of the second mobile communication system to determine a coordinating network component, the coordinating network component assigning radio resources for the communication between the first and second UEs, and transmits information related to the coordinating network component to the first UE, wherein the communicating with the network component of the second mobile communication system is carried out via the first and second UEs.

7. The apparatus of claim 6, wherein a communication link is enabled between the network components of the first and the second mobile communication systems via the first and second UEs.

8. The apparatus of claim 6, wherein a control interface is enabled between the network components of the first and the second mobile communication systems via the first and second UEs.

9. The apparatus of claim 6, wherein a communication link is enabled between the network components of the first and the second mobile communication systems via core networks/backhauls of the first and second mobile communication systems.

10. The apparatus of claim 6, wherein the coordinating network component assumes a master role of assigning the radio resources and the other network component assumes a slave role.

11. A method for a first user equipment (UE) of a first mobile communication system operated by a first operator, the method comprising:
transmitting information related to a subsequent direct communication with a second user equipment to a network component of the first mobile communication system, the second UE being assigned to a second mobile communication system operated by a second operator;
receiving information related to a coordinating network component from the first network component, the coordinating network component being a network component of the first or the second mobile communication system;
receiving information related to radio resources to use for the communication with the second UE from the coordinating network component; and
receiving a data packet from the network component of the first mobile communication system and forwarding the data packet to the second UE.

12. The method of claim 11, wherein the information related to the coordinating network component comprises information related to setting up a control link with the network component of the second mobile communication system in response to the coordinating network component being the network component of the second mobile communication system.

13. The method of claim 11, wherein the information related to the radio resource is received via the network component of the first mobile communication system.

14. The method of claim 11, further comprising enabling a communication link between the network components of the first and the second mobile communication systems via the second UE.

15. A method for a network component of a first mobile communication system operated by a first operator, the method comprising:
receiving information from a first User Equipment (UE) related to a subsequent direct communication with second UE being assigned to a second mobile communication system operated by a second operator;
communicating with a network component of the second mobile communication system to determine a coordinating network component, the coordinating network component assigning radio resources for the communication between the first and second UEs; and
transmitting information related to the coordinating network component to the first UE, wherein the communicating with the network component of the second mobile communication system is carried out via the first and second UEs.

16. The method of claim 15, further comprising enabling a communication link between the network components of the first and the second mobile communication systems via the first and second UEs.

17. The method of claim 15, further comprising enabling a control interface between the network components of the first and the second mobile communication systems via the first and second UEs.

18. The method of claim 15, further comprising enabling a communication link between the network components of the first and the second mobile communication systems via core networks/backhauls of the first and second mobile communication systems.

19. The method of claim 15, wherein the coordinating network component assumes a master role of assigning the radio resources and the other network component assumes a slave role.

20. A non-transitory computer readable medium including a program having program code for performing a method for a first user equipment (UE) of a first mobile communication system operated by a first operator, when the computer program is executed on a computer, a processor, or a programmable hardware component, the method comprising:

transmitting information related to a subsequent direct communication with a second user equipment to a network component of the first mobile communication system, the second UE being assigned to a second mobile communication system operated by a second operator;

receiving information related to a coordinating network component from the first network component, the coordinating network component being a network component of the first or the second mobile communication system;

receiving information related to radio resources to use for the communication with the second UE from the coordinating network component; and receiving a data packet from the network component of the first mobile communication system and forwarding the data packet to the second UE.

21. A non-transitory computer readable medium including a program having program code for performing a method for a network component of a first mobile communication system operated by a first operator, when the computer program is executed on a computer, a processor, or a programmable hardware component, the method comprising:

receiving information from a first User Equipment (UE) related to a subsequent direct communication with second UE being assigned to a second mobile communication system operated by a second operator;

communicating with a network component of the second mobile communication system to determine a coordinating network component, the coordinating network component assigning radio resources for the communication between the first and second UEs; and transmitting information related to the coordinating network component to the first UE, wherein the communicating with the network component of the second mobile communication system is carried out via the first and second UEs.

* * * * *